UNITED STATES PATENT OFFICE.

WILLIAM DAVIS AND JAMES DAVIS, OF RICHLAND, IOWA.

IMPROVED MODE OF KEEPING SWEET-POTATOES.

Specification forming part of Letters Patent No. 39,797, dated September 8, 1863.

*To all whom it may concern:*

Be it known that we, WILLIAM DAVIS and JAMES DAVIS, both of Richland, in the county of Keokuk and State of Iowa, have invented a certain new and useful Process or Improvements in the Process of Preserving Sweet-Potatoes; and we do hereby declare that the same is described in the following specification.

The nature of our invention and improvements in process of preserving sweet-potatoes consists in packing or filling the interstices between and around the potatoes with calcined or burnt sand and excluding air or moisture from the potatoes being preserved.

To enable others skilled in the art to use our process, we will proceed to describe it as follows:

We take fine river-sand or other fine sand, as free from vegetable, animal, or loamy matter as we can conveniently get it, and put it in an iron vessel or some other suitable situation and subject it to a low red heat and stir it so as to burn any vegetable or animal material or matter that may be mixed with it and allow it to cool, when it is fit or ready for use. We select the driest weather we can for digging the potatoes to be preserved and pack them, with as little delay as may be and as little exposure to light or air as consistent with their removal from the field, in boxes, barrels, or other vessels, and when the vessel is full of potatoes we pour or sift the calcined sand upon them, so that it will run down, around, and between them, so as to fill all the interstices between them and between them and the sides and bottom of the vessel, so as to exclude the air from the potatoes and absorb what moisture may be on the potatoes, and so forth, covering the potatoes in sand.

In selecting vessels in which to pack potatoes we prefer those that are or can be made, after the potatoes are packed in them, most nearly or quite air-tight. Keep the vessel in which the potatoes are packed where moisture will not penetrate it and in a temperature not lower than 35° of Fahrenheit nor higher than 90°. About 55° or 60° is best.

We believe we have described our improved process for preserving sweet-potatoes so as to enable others skilled in the art to use it. We will now state what we desire to secure by Letters Patent.

What we claim as our invention and improvement in preserving sweet-potatoes is—

Packing or filling the interstices between and around the potatoes with calcined or burnt sand and excluding air or moisture from the potatoes by the means and in the manner above substantially described.

WILLIAM DAVIS.
JAMES DAVIS.

Witnesses:
JOHN WASSON,
H. T. SMITH.